Nov. 30, 1943.     W. L. MacKENZIE     2,335,348
CEMENTING MACHINE
Filed Nov. 5, 1941     2 Sheets-Sheet 2
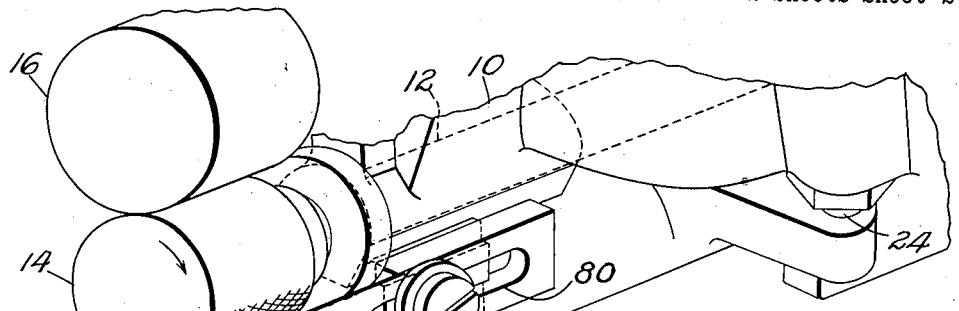
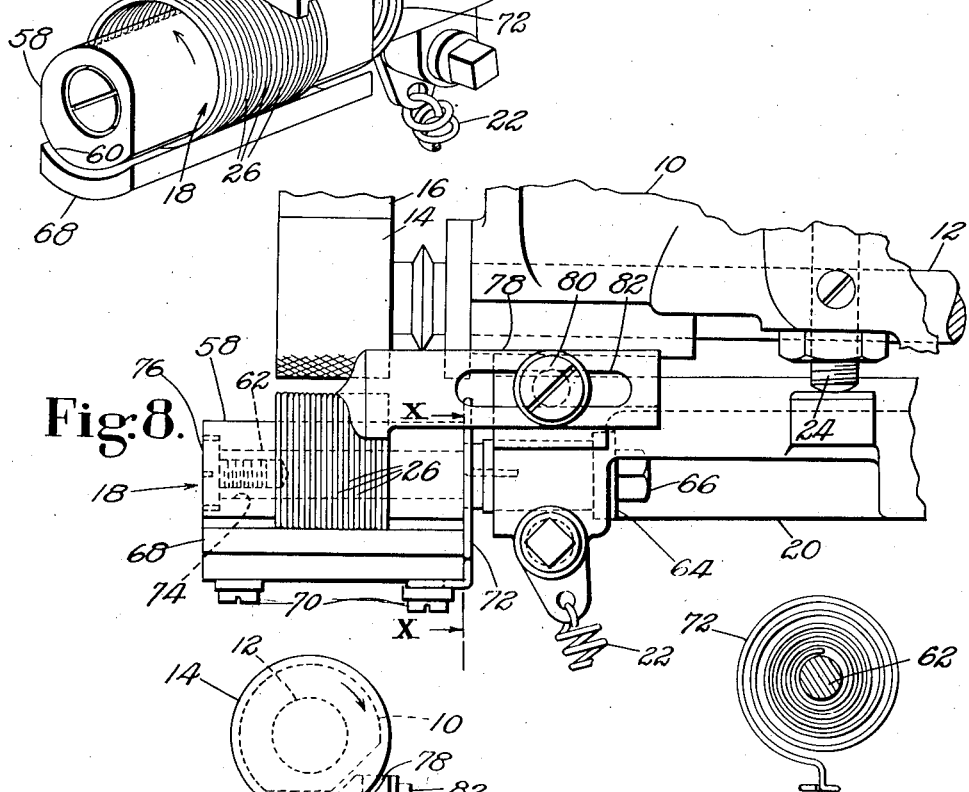
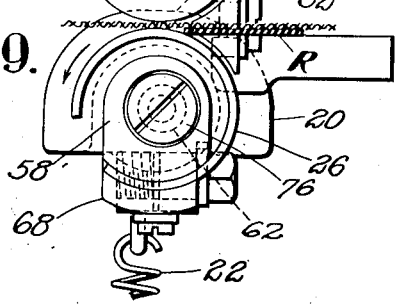
INVENTOR
William L. MacKenzie
By his attorney Patented Nov. 30, 1943

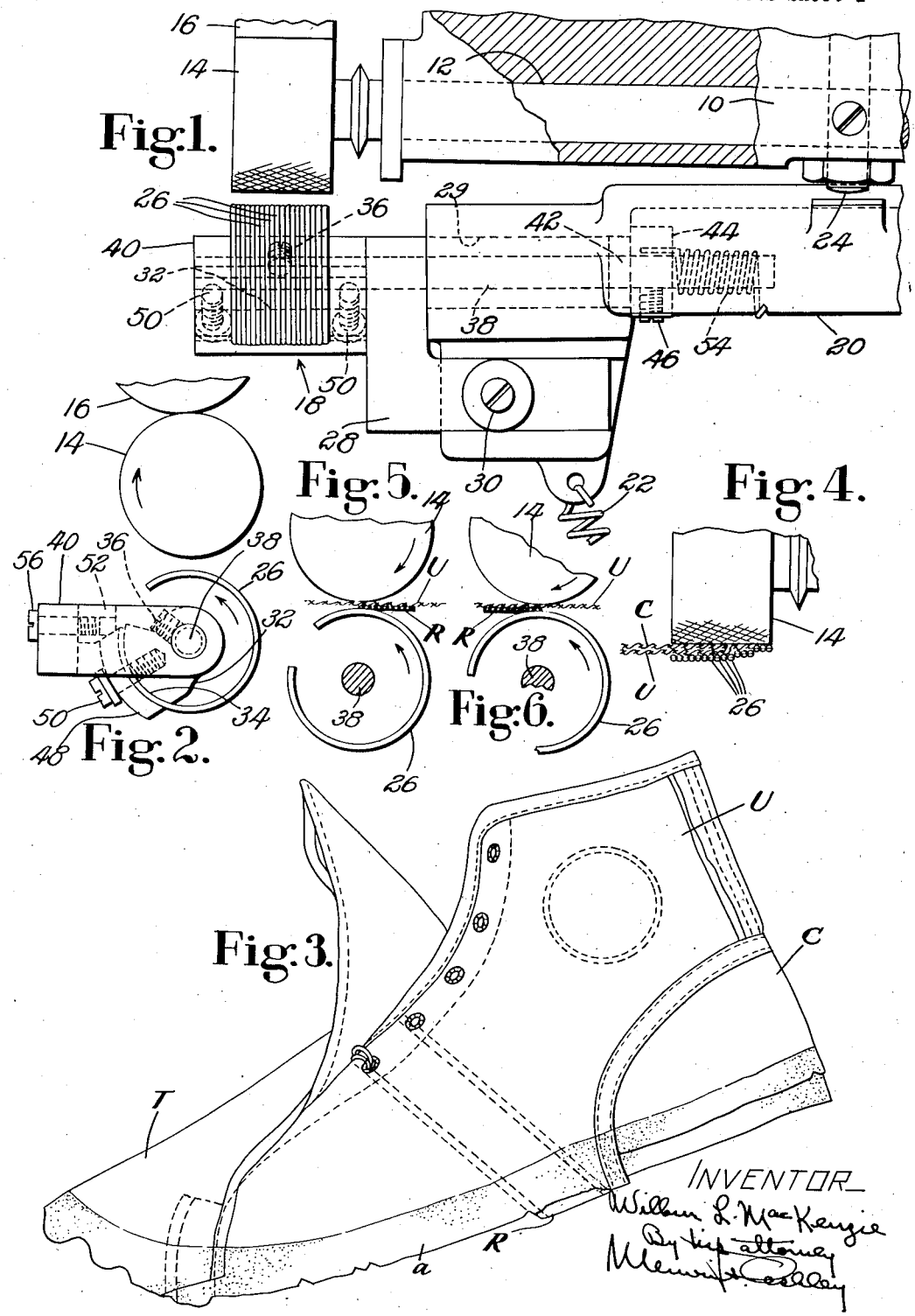

2,335,348

UNITED STATES PATENT OFFICE 2,335,348

CEMENTING MACHINE

Wilbur L. MacKenzie, Beverly, Mass., assignor to United Shoe Machinery Corporation, Flemington, N. J., a corporation of New Jersey Application November 5, 1941, Serial No. 417,901

22 Claims. (Cl. 91—50)

This invention relates to a machine for applying adhesive to shoe parts of varying thicknesses and more particularly to a machine for applying adhesive to the lasting margin of rubber shoes of the type commonly referred to as tennis shoes or sneakers.

In the manufacture of rubber shoes it is customary to assemble the top or upper, then to apply adhesive to the inside lower margin, and, finally, to place the upper upon a last and pull the coated margin in over an insole to which it is caused to adhere prior to the application of the rubber outsole. The junior at the rear of the upper, and the toe piece, which includes the tongue, are stitched to the vamp during the assembly and their edges generally terminate short of the marginal edge or lasting margin of the vamp. Consequently, the area to which the adhesive is to be applied is made up of surfaces which do not lie in the same plane.

As illustrated herein, a plurality of spring fingers are employed for holding the uneven surface of the lasting margin of a rubber shoe top against the surface of an adhesive applying roll. These fingers are narrow and are individually yieldable to and from the surface of the applying roll, thereby affording means for pressing every portion of the work against the applying roll regardless of its thickness. In some types of rubber shoes, however, typically those known as sneakers, wide decorative strips of rubberized material are applied to the upper along certain predetermined portions. Some of these strips extend down to the lasting margin. While these strips are on the display side of the upper and it is not necessary to apply adhesive to them, the rubber surface of the strips, especially if the rubber is only partially cured, creates so much friction that the strips will pass between the applying roll and the spring fingers only with difficulty. Often the rubber strips bunch up as the work advances, stalling the work or tearing the rubber.

It is an object of the present invention, therefore, to provide a machine having an improved supporting device for the spring fingers which will permit rapid and efficient application of adhesive to the lasting margin of rubber shoe tops.

In accordance with the object, a feature of the invention resides in a novel carrier for the fingers, for holding the work against the surface of the applying roll, which will permit them to move bodily with respect to the applying roll as soon as any substantial amount of friction is set up between the surfaces of the fingers and the applying roll, thereby permitting the rubber strip readily to pass between the fingers and the applying roll.

The spring fingers are commonly made up of spring steel wire and although they are originally bent to substantially perfect circles when mounted, as illustrated, with only one end secured, their free ends tend to straighten out to some extent. As a result, when the fingers roll with respect to the applying roll, the space between the fingers and the surface of the applying roll will vary, growing smaller or larger in accordance with the direction of rotation. In order to compensate for this eccentricity, invention resides in maintaining the operative portions of the fingers always equidistant from the applying roll. This is accomplished, as illustrated, by providing an eccentrically mounted carrier, to which the fingers are fastened and which may be adjusted on a supporting spindle to bring the fingers into such a position with respect to the applying roll that during their rotation a portion of their arcuate surfaces will lie opposite the applying roll and will remain substantially equidistant therefrom.

The specific details of the machine and its various features will now be described with reference to the accompanying drawings, in which Fig. 1 shows a front elevation of the adhesive-applying roll and pressure-applying fingers;

Fig. 2 is an end elevation of the parts shown in Fig. 1 as seen from the left side, showing the spring fingers in their normal position;

Fig. 3 discloses an angular view of a rubber shoe top or upper, wrong side out, showing the overlap of the junior, tongue and vamp along the lasting margin;

Fig. 4 is a fragmentary elevational view of the applying roll with the fingers in section, showing the way the fingers hold different thicknesses of the work in contact with the applying roll;

Figs. 5 and 6 are diagrams as if seen from the left side of Fig. 1, showing the progressive rotation of the spring fingers from the position shown in Fig. 2 as a rubber strip R passes between them and the applying roll;

Fig. 7 is an angular view of a modified form of the invention;

Fig. 8 is a front elevation of the parts shown in Fig. 7;

Fig. 9 is an end elevation of the parts shown in Fig. 7; and

Fig. 10 is a section on the line X—X of Fig. 8, showing the spring for returning the spring fingers from their displaced position to their normal position.

Referring to Fig. 3, there is shown a rubber shoe top or upper U for the type of shoe commonly called a sneaker, which consists of a combined vamp and quarter to which there is stitched a tongue T, including the tip, thereby forming what is commonly known as a circular or closed vamp. To the inside of the upper at the rear portion thereof a junior C is stitched. The lower edge of the junior terminates short of the edge of the upper at the rear portion thereof, and the tip, at the points where it is stitched to the vamp, terminates short of the edge of the vamp at the forepart, as illustrated in Fig. 3. To facilitate lasting, adhesive is applied to the lower inside edge or lasting margin of the upper entirely around the same in a broad band, as illustrated at a. It is evident from this that the surfaces of the junior and tip do not lie in the same plane with the vamp and quarter. In order, therefore, to insure the application of adhesive to these surfaces, in spite of the fact that they do not lie in the same plane, applicant has provided means for pressing the upper into engagement with the applying roll, as will appear hereinafter.

The machine employed herein is of the type disclosed in United States Letters Patent No. 1,851,162, granted March 29, 1932, on an application filed in the name of John W. Cosgrove, and, referring to Figs. 1 and 7 of the present application, consists of a frame 10 in which there is journaled a shaft 12 to one end of which is fixed for rotation therewith an applying roll 14. The shaft 12 has attached to its opposite ends means for driving the same, which is not shown herein. Adhesive is supplied to the surface of the roll 14 by a series of transfer rolls, one of which is shown at 16.

The means for holding the work against the surface of the applying roll is designated generally by the reference character 18 and is supported beneath the applying roll upon an arm 20 which is tiltably mounted at one end on the frame of the machine. The arm 20 is normally held away from the surface of the roll 14 by a coil spring 22 to permit ready insertion of the work. Means not shown herein is provided for raising the arm 20 to bring the supporting means 18 into co-operating engagement with the roll 14 to hold the work during the application of adhesive to the surface thereof, a stud 24 being provided for limiting the upward movement of the arm 20.

In one form of the invention, as illustrated in Figs. 1 and 2, the means 18 for holding the work against the applying roll consists of a plurality of substantially circular spring fingers 26 having very narrow work-engaging surfaces. The fingers 26 are mounted, as will appear hereinafter, side by side below the surface of the applying roll upon a rotatable member 32 which, in turn, is carried by a bracket 28 which is fastened to the arm 20 by a screw 30.

In the manufacture of sneakers, as heretofore stated, wide strips of rubberized material R (Fig. 3) are stitched on the display side of the upper according to some predetermined pattern. The ends of these strips of rubber R terminate close to the lasting margin of the upper and, consequently, during the application of the adhesive to the lasting margin, the rubber strip must pass between the applying roll and the pressure-applying fingers. Since the rubber strip is on the display side of the upper, it will come in contact with the pressure-applying fingers. The rubber naturally sets up considerable friction and, as a result, the strip tends to bunch as the work passes between the applying roll and the pressure-applying fingers, thereby stalling the work and sometimes tearing the rubber strip. In order to prevent this, the fingers are mounted on the bracket 28 so that when a force is set up tangential to the surface of the fingers at the point closest to the applying roll, the fingers will roll, in the direction of the force set up which is the same as the direction of the movement of the work, about a center common to their arcuate shape in a manner similar to a supporting roll, thereby permitting the work with the rubber strip readily to pass between the surfaces of the fingers and the applying roll. This is accomplished, as will be seen by reference to Figs. 1 and 2, by clamping the fingers 26 to a rotatable member 32 having a cylindrical surface 34, the member 32 being fixed by a setscrew 36 to a spindle 38, the spindle constituting the center of rotation of the fingers. The spindle 38 is journaled in a U-shaped member 40 integral with and extending horizontally from the bracket 28. The inner end of the spindle extends through an opening 29 in the end of the arm 20, as illustrated, and is held from displacement by a bushing 42 and collar 44, the latter being secured to the spindle by a setscrew 46. The clamping device for anchoring the fingers 26 to the cylindrical surface 34 is an overlying arcuate member 48 which is fastened at its ends to the member 32 by screws 50. To permit rotation of the fingers under the aforesaid tangential force, the spindle 38 is free to turn in the U-shaped member 40. Normally the spindle 38, member 32, and fingers are held from rotation against a stop 52 (Fig. 2) by a torsion spring 54. The stop 52 is fastened by a screw 56 to the U-shaped member 40 and lies in the path of an edge of the arcuate member 48, which serves as an abutment. The torsion spring 54 is mounted on the inner end of the spindle 38, one end of the spring being secured to the arm 20 and the other end being anchored to the collar 44. When the work is placed between the fingers 26 and the applying roll and the arm 20 is raised to bring the fingers into engagement with the work, the work will pass between the fingers and the applying roll, the fabric surface of the work sliding over the fingers without creating enough friction to cause the fingers and spindle to turn against the action of the torsion spring 54. When, however, a strip of rubber comes into contact with the fingers, it does not slide readily over the surfaces thereof. Consequently, a tangential force is set up which tends to displace the fingers in the direction of movement of the work (Figs. 5 and 6). Since the fingers are fastened to the spindle 38, they rotate with it on the bracket 28. This rolling action permits the strip of rubber to pass between the fingers and the applying roll without causing bunching or tearing of the rubber. As soon as the strip of rubber passes between the fingers and the applying roll, the friction is reduced so that the work slides freely on the fingers again and the torsion spring 54 quickly returns the spring fingers to their original position. Consequently, when the next strip of rubber is ready to pass between the applying roll and the fingers, the fingers will be ready for another partial rotation.

Because the fingers are fixed only at one end, there is a tendency for the free ends to straighten out to some extent and, in fact, for the entire length of the fingers to spring outwardly so that they are not truly concentric with the spindle with which they turn. As a result, when the fingers rotate with the spindle, the space between the fingers and the applying roll will increase or decrease, depending upon the direction of rotation. In some types of work the rubber strips applied to the upper are only partially cured and, as a result, the friction between the rubber and the fingers is very great. When such work is being handled, the distance between the fingers and the applying roll must not vary but must be uniform during the rolling motion of the fingers, or the rubber will bunch between the applying roll and the fingers, thereby stalling the work in a manner described heretofore. Since the width of the rubber strips is not as great as the length of the fingers, only a portion of the arcuate surface of each finger comes into active operation relative to the applying roll. This active portion of each of the fingers will depend upon the width of the strip, and it is this portion which must be adjusted so that all parts of it will be substantially equidistant from the applying roll. To this end, in a modified form of the invention the spring fingers 26 are mounted for rotation as shown in Figs. 7, 8 and 9. In this case, the spring fingers 26 are fastened to a member 58 which has a cylindrical surface 60, the former being adjustably fixed to a spindle 62. The spindle 62 is journaled for rotation in the arm 20 and is held in place by a washer 64 and nut 66. The fingers are secured to the cylindrical portion of the member 58 by an arcuate member 68 which is secured to the member 58 by screws 70. Normally, the spindle 62 is held from turning, and is returned to its original position after rotation, by a spring 72 (Fig. 10) one end of which is fastened to the member 68 and the other end of which is anchored to the arm 20. It is to be observed that the member 58 is provided with a bore 74 (Fig. 8) which is eccentric to the cylindrical surface 60 thereof and that the member 58 is adjustably held on the spindle 62, which extends through this bore, by a screw 76. By releasing the screw 76 the member 58 may be turned on the spindle 62 to change the eccentricity of the member 58, and consequently of the fingers 26 which are fastened thereto, with respect to the applying roll. By this means the active portion of the fingers 26 may be brought to such a position that during the rotation of the fingers with respect to the applying roll these portions will always be a substantially uniform distance from the applying roll.

In both forms of the invention shown here, a gage 78 (not shown in Fig. 1) is employed against which the work may be held in order to govern the width of the band of adhesive to be applied to the work. The gage 78 is fastened to the arm 20 by a slot-and-screw connection 80, 82 and may be moved longitudinally of the axis of the applying roll and fingers in accordance with the width of the band adhesive to be applied to the work.

When a machine is equipped in the manner described in Figs. 1 and 2, the operator places the margin of the closed upper wrong side out over the end of the supporting means 18 with its edge against the gage 78 and then treadles the arm 20 upwardly to raise the fingers 26, thereby to bring the work into engagement with the applying roll. By the combined rotation of the applying roll and the pull exerted by the operator, the upper is moved around its entire periphery between the applying roll and the fingers. When the junior or overlapping tip at the points stitched to the vamp comes between the fingers and the applying roll, the fingers yield different amounts according to the thickness of the work, as illustrated in Fig. 4. Each time a rubber strip comes into contact with the spring fingers, the latter will roll in the direction of movement of the work until the strip passes, whereupon the spring 54 snaps the fingers back against the stop 52 to their original position. When the modified form of the invention is to be employed, the eccentric must first be set to bring that portion of the fingers which will be used into a position with respect to the surface of the applying roll so that during the rotation of the fingers these portions will always be a substantially uniform distance from the applying roll. Thereafter, the work is passed through the machine in the manner described above.

Having described my invention, what I claim as new and desire to secure by Letters Patent of the United States is:

1. A machine for applying adhesive to a shoe part comprising an applying roll, a plurality of spring fingers co-operating therewith to hold the work against the applying roll, means for supporting said fingers for rotation about an axis parallel to the axis of the applying roll, and means for resisting said rotation.

2. A machine for applying adhesive to a shoe part moving in a predetermined direction comprising an applying roll, a plurality of spring fingers co-operating therewith to hold the work against the applying roll, means for supporting said fingers for rotational displacement in the direction of movement of the work upon the application of a force tangential to the fingers at substantially their closest point to the surface of the applying roll, and means for returning the fingers from their displaced position upon the discontinuance of said force.

3. A machine for applying adhesive to a shoe part comprising an applying roll, a support, a plurality of spring fingers mounted on said support for holding the work against the applying roll, said fingers being individually yieldable on said support to and from the surface of the applying roll and rotatable as a whole on said support about an axis parallel to the axis of the applying roll, and means for resisting rotation of said fingers.

4. A machine for applying adhesive to a shoe part comprising an applying roll, a support, and a plurality of substantially ring-like fingers arranged along said support side by side in vertical planes, a portion of each finger being individually yieldable to and from the surface of the applying roll, said fingers being rotatable as a whole on said support about an axis passing through substantially the geometric center of said ring-like fingers.

5. A machine for applying adhesive to a shoe part comprising an applying roll, a spindle parallel to the applying roll, a plurality of spring fingers for holding the work against the applying roll, said fingers being arranged along said spindle, individually yieldable to and from the surface of the applying roll and rotatable as a whole about the axis of the spindle, and means for resisting the rotation of said fingers.

6. A machine for applying adhesive to a shoe part comprising an applying roll, a support adjacent to the applying roll, a spindle rotatably mounted on said support parallel to the applying roll, a plurality of spring fingers for holding the work against the applying roll, said fingers being fixed to the spindle, independently yieldable to and from the surface of the applying roll and rotatable as a whole with the spindle about the axis thereof, and means for resisting the rotation of said fingers.

7. A machine for applying adhesive to a shoe part comprising an applying roll, a plurality of spring fingers for holding the work against the applying roll, said fingers being yieldable to and from the surface of the applying roll, a stop, and means for urging said fingers to turn as a whole about an axis parallel to the axis of the applying roll, said stop serving to prevent rotation of the fingers in one direction beyond a predetermined position.

8. A machine for applying adhesive to a shoe part comprising an applying roll, a rotatable spindle, a plurality of spring fingers for holding the work against the applying roll, said fingers being mounted on said spindle, a stop, an abutment on said spindle, and means for constantly urging the spindle to turn in a direction to hold the abutment against the stop.

9. A machine for applying adhesive to a shoe part comprising an applying roll, a support adjacent thereto, a rotatable spindle journaled on said support, a plurality of spring fingers for holding the work against the applying roll, means for clamping said fingers at one end to said spindle, the other ends of said fingers being unrestrained, a stop on said support, an abutment on said spindle, and means for constantly urging said spindle to turn in a direction to hold the abutment against the stop.

10. A machine for applying adhesive to a moving shoe part comprising an applying roll, a plurality of arcuate spring fingers co-operating therewith to hold the work against the applying roll, means for supporting said fingers for rotation in the direction of movement of the work, and means for maintaining a portion of the surfaces of said arcuate fingers substantially equidistant from the surface of the applying roll during the rotation of said fingers.

11. A machine for applying adhesive to a moving shoe part comprising an applying roll, a plurality of arcuate spring fingers co-operating therewith to hold the work against the applying roll, means for supporting said fingers for rotation in the direction of movement of the work, and an eccentric for maintaining a portion of the surfaces of said arcuate fingers substantially equidistant from the surface of the applying roll during the rotation of said fingers.

12. A machine for applying adhesive to a shoe part comprising an applying roll, a spindle parallel to the applying roll, a plurality of arcuate spring fingers for holding the work against the applying roll, said fingers being mounted on said spindle and rotatable as a whole with the same, and means for adjusting the fingers on said spindle to cause a portion of the surfaces of said arcuate fingers to be substantially equidistant from the surface of the applying roll during the rotation of said fingers.

13. A machine for applying adhesive to a shoe part comprising an applying roll, a spindle parallel to the applying roll, a plurality of arcuate spring fingers for holding the work against the applying roll, said fingers being mounted on said spindle and rotatable as a whole with the same, and an eccentric for adjusting the fingers with respect to the spindle to cause an arcuate portion of the fingers to be substantially equidistant from the surface of the applying roll during the rotation of said fingers.

14. A machine for applying adhesive to a shoe part comprising an applying roll, a rotatable spindle parallel to the applying roll, an eccentric mounted on said spindle, a plurality of arcuate spring fingers fastened to said eccentric, said eccentric and fingers being rotatable with the spindle about the axis thereof, and means for adjusting the position of the eccentric with respect to the spindle to cause a portion of the surfaces of the fingers to be substantially equidistant from the surface of the applying roll during the rotation of said fingers.

15. A machine for applying adhesive to a moving shoe part comprising an applying roll, a plurality of arcuate spring fingers co-operating therewith to hold the work against the applying roll, means for supporting said fingers for rotation in the direction of movement of the work, means for maintaining a portion of the surfaces of said fingers substantially equidistant from the surface of the applying roll during the rotation of said fingers, and means for resisting rotation of said fingers.

16. A machine for applying adhesive to a moving shoe part comprising an applying roll, a plurality of arcuate spring fingers co-operating therewith to hold the work against the applying roll, means for supporting said fingers for displacement in the direction of movement of the work upon the application of a force tangential to the fingers at substantially their closest point to the applying roll, said means comprising a spindle and an eccentric mounted thereon to which the fingers are attached, said eccentric being adjustable to maintain a portion of said fingers substantially equidistant from the surface of the applying roll during the displacement, and means for returning the fingers from their displaced position upon the discontinuance of said tangential force.

17. A machine for applying adhesive to a shoe part comprising an applying roll, a plurality of spring fingers co-operating therewith to hold the work against the applying roll, means supporting said fingers for rotation about an axis parallel to the axis of the applying roll, and means arranged to maintain said fingers initially in a predetermined position, said supporting means being constructed to permit displacement of the fingers about said parallel axis in response to the application of a tangential force.

18. A machine for applying adhesive to a shoe part comprising an applying roll, a plurality of spring fingers co-operating therewith to hold the work against the applying roll, means for supporting said fingers for rotational displacement about an axis parallel to the axis of the applying roll upon the application of a force tangential to said fingers, and means for reversing the rotation of said fingers and for limiting their reverse movement to a predetermined initial position.

19. A machine for applying adhesive to a shoe part comprising an applying roll, a plurality of spring fingers for holding the work against the applying roll, said fingers being yieldable to and from the surface of the applying roll, means for urging said fingers to turn as a whole about an axis parallel to the axis of the applying roll, and means for limiting the rotation of said fingers in one direction beyond a predetermined position.

20. A machine for applying adhesive to a moving shoe part comprising an applying roll, a plurality of arcuate spring fingers co-operating therewith to hold the work against the applying roll, means for supporting said fingers for rotational displacement in the direction of movement of the work, means for maintaining a portion of the surface of said arcuate fingers substantially equidistant from the surface of the applying roll during rotation of said fingers, and means for reversing the rotation of said fingers and for limiting their reverse movement to a predetermined initial position.

21. A machine for applying adhesive to a moving shoe part comprising an applying roll, a plurality of arcuate spring fingers co-operating therewith to hold the work against the applying roll, means for supporting said fingers for rotational displacement in the direction of movement of the work, means for maintaining a portion of the surface of said arcuate fingers substantially equidistant from the surface of the applying roll during the rotation of said fingers, and means for reversing the rotation of said spring fingers, said means being adapted initially to maintain said fingers in a predetermined position.

22. A machine for applying adhesive to a moving shoe part comprising an applying roll, a plurality of arcuate spring fingers co-operating therewith to hold the work against the applying roll, means for supporting said fingers for rotational displacement in the direction of movement of the work, means for maintaining a portion of the surface of said arcuate fingers substantially equidistant from the surface of the applying roll during the rotation of said fingers, and a spring for reversing the rotation of said fingers to their initial predetermined position, said spring being so arranged that in a state of equilibrium it holds said fingers in said predetermined initial position.

WILBUR L. MacKENZIE.